United States Patent Office

2,755,221
Patented July 17, 1956

2,755,221

ENHANCING SOLUBILITY OF CHLORETHYL-THEOPHYLLINE BY NICOTINAMIDE AND RESULTING COMPOSITION

Karl Schoen, Kew Gardens, N. Y., assignor to Endo Laboratories Inc., Richmond Hill, N. Y., a corporation of New York No Drawing. Application May 1, 1953,
Serial No. 352,583

4 Claims. (Cl. 167—67)

This invention relates to 7-(beta - chloro - ethyl)-theophylline. In particular, it is directed to enhancing the water solubility thereof.

The novel compound 7-(beta-chloro-ethyl)-theophylline, a new therapeutically important compound, has been described by Albert Schlesinger in his pending application Serial No. 323,921 filed December 3, 1952. This new compound is but sparingly soluble in water, the saturated aqueous solution thereof containing the compound in a concentration of 0.67%. The sparing solubility of this new compound in water is a characteristic of other well known related purine derivatives used in therapeusis as for example theophylline, theobromine and caffeine. For the preparation of aqueous solutions of the latter compounds is to be used for oral or parenteral administration resort has been had to the formation of complexes or salts of those compounds with ethylene diamine, methyl glucamine, diethanolamine, sodium benzoate, calcium and sodium salicylate, sodium acetate and other compounds.

Preparations thus prepared are characterized by certain disadvantages because of the fact that the salts used as for example the salicylates and the benzoates possess and exert a pharmacological action of their own which in some cases may be undesirable or objectionable; or the resulting solutions, when the amines are employed, are strongly alkaline and therefore are irritating to the tissues resulting in damage, sometimes quite severe, to the tissue.

I have conducted investigations directed to discovering means for effectuating a marked improvement in the solubilization of 7-(beta-chloro-ethyl)-theophylline by means which will avoid the disadvantageous or objectionable characteristics of the previously known means employed to solubilize the aforedescribed related purine derivatives. I have discovered that it is now possible to prepare aqueous solutions of 7 - (beta - chloro - ethyl)-theophylline which are suitable for oral and parenteral administration.

Accordingly, it is an object of the present invention to provide an innocuous, non-toxic means for solubilizing the 7-(beta-chloro-ethyl)-theophylline; and particularly to provide aqueous solutions having a pH in the physiological range that is close to neutral.

It is a further object of this invention to provide aqueous solutions of 7-(beta-chloro-ethyl)-theophylline which will be well tolerated upon oral or parenteral administration without irritation or damage to the tissues.

The foregoing objects as well as other objects which will become apparent from the more detailed description of the invention, hereinafter to be set forth, are accomplishable by the unexpected and surprising discovery that nicotinamide possesses the specific property of solubilizing 7 - (beta - chloro - ethyl)-theophylline. The solutions thus formed are stable, water-clear liquids having a pH of from 6.0 to 6.5 which are non-irritating to living tissues and are well tolerated upon oral, subcutaneous, intramuscular or intravenous administration. Nicotinamide itself has no pronounced pharmacological action of its own and its toxicity is of a very low order of magnitude.

The solubilizing influence of nicotinamide upon 7-(beta-chloro-ethyl)-theophylline is evidenced by the following series of experiments. An excess of 7-(beta-chloro-ethyl)-theophylline was shaken at room temperature (25° C.) for 2 hours with aqueous solutions containing 0 to 30% nicotinamide, the solutions kept undisturbed overnight, filtered, and the chloroethyl theophylline content of the saturated solutions determined. The following results were obtained:

*Solubility of 7 - (beta - chloro - ethyl) - theophylline in solutions of nicotinamide*

| Concentration of Nicotinamide in percent | Concentration of 7-(beta-chloro-ethyl)-theophylline in percent |
|---|---|
| 0 | 0.67 |
| 1 | 1.3 |
| 5 | 2.9 |
| 10 | 4.7 |
| 20 | 14.6 |
| 30 | 33.0 |

It is observed that at the highest concentration shown the total solid content of the solution is 63%.

These solutions are saturated at 25° C. and lowering of the temperature causes crystallization of part of the dissolved material.

To achieve the convenient preparation of permanent and stable solutions of 7-(beta-chloro-ethyl)-theophylline, I use approximately 4 moles of nicotinamide for each 1 mole of 7-(beta-chloro-ethyl)-theophylline or roughly about 2 grams of nicotinamide for each 1 gram of 7-(beta-chloro-ethyl)-theophylline.

The solutions are prepared readily by stirring the ingredients with water at room temperature in any concentration up to 190 mg. of 7-(beta - chloro - ethyl)-theophylline per ml. In a solution thus formed the 7-(beta-chloro-ethyl)-theophylline is present in a concentration of 19% as contrasted with the concentration of 0.67% in water alone. Such solutions are stable indefinitely at room temperature, and can be diluted with water to any desired degree of lesser concentration. The 7-(beta-chloro-ethyl)-theophylline does not crystallize out upon prolonged standing.

The aqueous solutions of 7 - (beta - chloro - ethyl)-theophylline prepared in accordance with this invention can be administered either orally or parenterally or as nasal or bronchial sprays. The dry mixtures of 7-(beta-chloro-ethyl)-theophylline with the nicotinamide can be used in the form of tablets or capsules or they can be put up in the form of suppositories for rectal application. Additionally, the dry mixtures of the aforesaid compounds, or the solutions thereof, can be used either alone or in combination with other drugs. It is also to be noted that the compositions comprising the 7-(beta-chloro-ethyl)-theophylline and the nicotinamide can be used in many phases of human as well as veterinary therapeusis.

The solubilizing action of the nicotinamide on the 7-(beta-chloro-ethyl)-theophylline is quite specific and not general for all xanthine derivatives. I have found for example that theobromine is not appreciably solubilized even when large excesses of nicotinamide are used. I have also found that the solubility of theophylline itself is not appreciably enhanced by nicotinamide. The utmost concentration of theophylline in water which can be achieved with the use of nicotinamide is about 2%, a concentration which is not at all comparable with the 19% solubility of 7-(beta-chloro-ethyl)-theophylline.

The following are illustrative examples of compositions made in accordance with this invention.

Example 1

A mixture of 47.5 grams of 7-(beta-chloro-ethyl)-theophylline and 95 grams of nicotinamide were stirred at room temperature with enough water to produce a volume of 250 ml. The clear solution thus produced contains 190 mg. of 7-(beta-chloro-ethyl)-theophylline and 380 mg. of nicotinamide per ml. The solution was filtered through paper, then through a sterile bacterial filter, and filled asceptically into glass ampules and rubber capped vials. These ampules and vials showed no sign of crystalization or change in color after standing for 3 months at room temperature.

The aforesaid solution has a pH of from 6.0 to 6.5. It can be diluted with water to any desired concentration; and the resulting solutions remain water-clear for an indefinite length of time. I found that the autoclaving of the concentrated or dilute solutions at 120° C., or heating to 100° C. on a steam bath results in considerable decomposition of the 7 - (beta - chloro - ethyl)-theophylline with concomitant formation of a yellow color. On the other hand, when allowed to stand at room temperature for 3 months there is no decomposition thereof.

Example 2

10 grams of 7-(beta-chloro-ethyl)-theophylline and 20 grams of nicotinamide were dissolved at room temperature in the minimum amount of water needed to dissolve the materials, and the solution thus produced was then evaporated to dryness in a desiccator under vacuum at room temperature. The resulting powder melts at 98° C. to form a turbid liquid which becomes clear at 123° C. 10 grams of this powder dissolve in approximately 11 ml. of water at room temperature to produce a clear solution.

Example 3

10 grams of 7-(beta-chloro-ethyl)-theophylline and 20 grams of nicotinamide were mixed intimately until a homogeneous fine powder was produced. This dry mixture dissolves easily in water at room temperature.

The 7-(beta-chloro-ethyl)-theophylline may be prepared as follows:

224 grams of 7-($\beta$-hydroxyethyl)-theophylline (1 mol) were suspended in 1,000 ml. of dry benzene, and cooled in an ice-salt bath. With stirring, 400 ml. of thionyl chloride, $SOCl_2$ (an excess of between 2 and 3 mols), were introduced into the above cooled suspension, the temperature being maintained so as not to exceed 5° C. After all of the thionyl chloride had been added, the mixture was refluxed until the reaction was completed, as manifested by the cessation of sulfur dioxide and hydrogen chloride liberation, and the fact that all of the 7-($\beta$-hydroxyethyl)-theophylline went into solution. The reaction generally goes to completion within from 15–20 hours. The solvent and the excess of the thinoyl chloride were then evaporated under reduced pressure; and the residue, the 7-($\beta$-chloro-ethyl) - thophylline, was recrystallized from alcohol.

It will be understood that the foregoing description of the invention and the examples set forth are merely illustrative thereof. Accordingly, the appended claims are to be construed as defining the invention within the full spirit and scope thereof.

I claim:

1. Method of enhancing the water solubility of 7-(beta-chloro-ethyl)-theophylline which comprises dissolving 7-(beta - chloro - ethyl) - theophylline and nicotinamide in water.

2. An aqueous solution of 7-(beta-chloro-ethyl)-theophylline in a concentration exceeding the saturation concentration of 7-(beta-chloro-ethyl)-theophylline per se in water comprising water, 7-(beta-chloro-ethyl)-theophylline and nicotinamide.

3. Method of enhancing the water solubility of 7-(beta-chloro-ethyl)-theophylline which comprises dissolving in water 7-(beta-chloro-ethyl)-theophylline and nicotinamide, the ratio of the nicotinamide to the 7-(beta-chloro-ethyl)-theophylline being such that a concentration of said ingredients in the solution up to 30 per cent:33.0 per cent, respectively, is achieved.

4. An aqueous solution of 7-(beta-chloro-ethyl)-theophylline in a concentration exceeding the saturation concentration of 7-(beta-chloro-ethyl)-theophylline per se in water comprising 7-(beta-chloro-ethyl)-theophylline and nicotinamide, the ratio of the nicotinamide to the 7-(beta-chloro-ethyl)-theophylline being such that a concentration of said ingredients in the solution up to 30 per cent:33.0 per cent, respectively, is achieved.

No references cited.